United States Patent [19]

Yoshimura et al.

[11] Patent Number: 4,761,554

[45] Date of Patent: Aug. 2, 1988

[54] RADIATION IMAGE READ-OUT APPARATUS

[75] Inventors: Ryoichi Yoshimura; Shumpeita Torii, both of Kanagawa, Japan

[73] Assignee: Fuji Photo Film Co., Ltd., Kanagawa, Japan

[21] Appl. No.: 10,530

[22] Filed: Feb. 3, 1987

[30] Foreign Application Priority Data

Feb. 3, 1986 [JP] Japan .................................. 61-21728
Feb. 10, 1986 [JP] Japan .................................. 61-27352

[51] Int. Cl.⁴ .............................................. G01T 1/105
[52] U.S. Cl. ................................ 250/327.2; 250/484.1
[58] Field of Search ........................... 250/327.2, 484.1

[56] References Cited

U.S. PATENT DOCUMENTS

| | | | |
|---|---|---|---|
| 3,774,902 | 11/1973 | Schulze | 271/293 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,400,619 | 8/1983 | Kotera et al. | 250/327.2 |
| 4,578,582 | 3/1986 | Takano | 250/327.2 |
| 4,678,180 | 7/1987 | Tamura et al. | 271/296 |

FOREIGN PATENT DOCUMENTS 0011395 2/1981 Japan .................................. 250/327.2

*Primary Examiner*—Janice A. Howell
*Assistant Examiner*—Constantine Hannaher
*Attorney, Agent, or Firm*—Sughrue, Mion, Zinn, Macpeak, and Seas

[57] ABSTRACT

A radiation image read-out apparatus comprises a read-out section for reading out a radiation image stored on a stimulable phosphor sheet, and an erasing section for erasing radiation energy remaining on the stimulable phosphor sheet after image read-out from the stimulable phosphor sheet is finished. The apparatus also comprises a cassette holding section for releasably holding a plurality of cassettes each capable of housing a stimulable phosphor sheet therein, and a sheet conveyance system for taking a stimulable phosphor sheet out of an arbitrary one of the cassettes, conveying the stimulable phosphor sheet to the read-out section and the erasing section, and then conveying the stimulable phosphor sheet into an arbitrary one of the cassettes. The apparatus may further comprise a stacker capable of supporting a plurality of the stimulable phosphor sheets, receiving the stimulable phosphor sheets erased at the erasing section, and selectively feeding the supported stimulable phosphor sheets one by one out of the stacker.

20 Claims, 6 Drawing Sheets

RADIATION IMAGE READ-OUT APPARATUS

BACKGROUND OF THE INVENTION

1. Field of the Invention

This invention relates to a radiation image read-out apparatus for use in a radiation image recording and reproducing system. This invention particularly relates to a radiation image read-out apparatus wherein a read-out section and an erasing section are combined integrally.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object such as the human body to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to an electric image signal, and the radiation image of the object is reproduced as a visible image by use of the image signal on a recording material such as a photographic film, a display device such as a cathode ray tube (CRT), or the like.

In the aforesaid radiation image recording and reproducing system, the stimulable phosphor sheet is used to temporarily store a radiation image until the sheet is scanned with stimulating rays to read out the radiation image. Therefore, after the radiation image is read out from the stimulable phosphor sheet, radiation energy remaining thereon should be erased to reuse the sheet.

For satisfying this requirement, it has been proposed to provide a radiation image read-out apparatus with a read-out section for reading out an image stored on a stimulable phosphor sheet, and an erasing section for erasing radiation energy remaining on the sheet.

In the proposed radiation image read-out apparatus, a cassette housing a stimulable phosphor sheet carrying a radiation image stored thereon by use of an external image recording apparatus is fed to a cassette holding section, and the stimulable phosphor sheet is taken out of the cassette and sent to the read-out section for reading out the radiation image. After the image read-out is finished, the sheet is sent to the erasing section where radiation energy remaining on the sheet is erased. The erased sheet is taken out of the read-out apparatus and reused for image recording. In general, a plurality of the erased reusable sheets are stacked in a stacking tray inside of the read-out apparatus, and taken out of the read-out apparatus in the form housed in the stacking tray. Since the sheets stacked in the stacking tray should be housed one by one in a cassette as mentioned above when they are to be reused for image recording, it is necessary to load the sheets one by one into a cassette prior to image recording. Though loading of the sheet into the cassette is carried out by use of a special-purpose loader or manually, the cost of the overall system increases in the case where the special-purpose loader is used, and manual loading is disadvantageous from the viewpoint of sheet processing since the sheet must be touched directly with the hand.

One approach to the elimination of the aforesaid drawbacks is to eliminate the necessity of conducting the aforesaid loading operation by directly conveying the stimulable phosphor sheet into the cassette after the sheet taken out of the cassette is sent to the read-out section and the erasing section and image read-out and erasing are conducted on the sheet. However, with the conventional read-out apparatus, the cassettes are loaded one by one to the cassette holding section. Therefore, in the case where the sheet is returned into the cassette as mentioned above, after a first cassette is loaded into the read-out apparatus, the next cassette cannot be loaded into the apparatus until the sheet is taken out of the first cassette, subjected to image read-out and erasing, and then housed in the first cassette. Thus the operations for loading the cassettes to the apparatus become complicated. Specifically, in many cases, the aforesaid read-out apparatus must conduct the processing of a plurality of the sheets continuously. Particularly, in the case where image recording is conducted continuously in the image recording apparatus and the cassettes housing the sheets carrying a radiation image stored thereon are sequentially sent to the read-out apparatus, it is necessary to exchange the cassette loaded to the read-out apparatus each time the processing of a single sheet is finished in the read-out apparatus in order to operate the read-out apparatus efficiently. Accordingly, the operator of the read-out apparatus must, for example, stand by holding the next cassette housing the sheet carrying a radiation image stored thereon. As a result, the time used for exchanging of the cassettes becomes long, and the cassette exchanging operations become complicated and nonefficient.

SUMMARY OF THE INVENTION

The primary object of the present invention is to provide a radiation image read-out apparatus for conducting image read-out and erasing in a single apparatus, and for returning a stimulable phosphor sheet into a cassette inside of the apparatus after image read-out and erasing are conducted on the sheet taken out of the cassette, wherein the time and labor requirements for cassette loading to the apparatus are decreased.

Another object of the present invention is to provide a radiation image read-out apparatus for conducting image read-out and erasing in a single apparatus, and for returning a stimulable phosphor sheet into a cassette inside of the apparatus after image read-out and erasing are conducted on the sheet taken out of the cassette, wherein processing of a plurality of the sheets is conducted efficiently.

The specific object of the present invention is to provide a radiation image read-out apparatus for conducting image read-out and erasing in a single apparatus, and for returning a stimulable phosphor sheet into a cassette inside of the apparatus after image read-out and erasing are conducted on the sheet taken out of the cassette, wherein the drawback that the apparatus is occupied by a single sheet is eliminated, and a plurality of the sheets are efficiently circulated and reused.

The present invention provides a radiation image read-out apparatus comprising:

(i) a read-out section for reading out a radiation image stored on a stimulable phosphor sheet, (ii) an erasing section for erasing radiation energy remaining on said stimulable phosphor sheet after image read-out from said stimulable phosphor sheet is finished, (iii) a cassette holding section for releasably holding a plurality of cassettes capable of housing said stimulable phosphor sheet therein, and (iv) a sheet conveyance means for taking said stimulable phosphor sheet out of an arbitrary one of said plurality of the cassettes, conveying said stimulable phosphor sheet to said read-out section and said erasing section, and then conveying said stimulable phosphor sheet into an arbitrary one of said plurality of the cassettes.

The present invention also provides a radiation image read-out apparatus wherein the apparatus further comprises a stacker capable of supporting a plurality of said stimulable phosphor sheets, receiving said stimulable phosphor sheets erased at said erasing section, and selectively feeding said supported stimulable phosphor sheets one by one out of said stacker, and said sheet conveyance means is constituted to take said stimulable phosphor sheet out of an arbitrary one of said plurality of the cassettes, convey said stimulable phosphor sheet to said read-out section and said erasing section in this order, thereafter convey said stimulable phosphor sheet into said stacker, receive said stimulable phosphor sheet fed out of said stacker, and convey said stimulable phosphor sheet into an arbitrary one of said plurality of the cassettes held at said cassette holding section.

With the radiation image read-out apparatus in accordance with the present invention, since a plurality of the cassettes are held at the cassette holding section, it is possible to load the plurality of the cassettes housing the stimulable phosphor sheets carrying a radiation image stored thereon simultaneously or sequentially to the cassette holding section. Also, since the sheet conveyance means takes the stimulable phosphor sheet out of an arbitrary one of the plurality of the cassettes and conveys the sheet on which image read-out and erasing have been finished into an arbitrary one of the plurality of the cassettes, the sheets on which image read-out and erasing have been finished are housed in all of the plurality of the cassettes loaded to the read-out apparatus after a predetermined time elapses. Therefore, since it is possible to conduct unloading of the plurality of the cassettes simultaneously from the read-out apparatus, it becomes unnecessary to exchange the cassettes each time the erased reusable sheet is conveyed into a single cassette. As a result, the operator need not frequently perform the cassette exchanging operation, and it is possible to conduct sheet processing continuously. Since the freedom of the cassette exchanging timing becomes high and the operation frequency of the operator and the time bound for the cassette exchange are decreased, it is possible to conduct sheet processing efficiently when a plurality of the stimulable phosphor sheets are to be processed continuously.

Also, with the second mentioned radiation image read-out apparatus in accordance with the present invention, which is provided with the stacker, since the stacker is disposed midway of the sheet conveyance means between the erasing section and the cassette holding section, it is possible to convey the erased reusable sheet out of the stacker into a cassette immediately after the stimulable phosphor sheet is taken out of said cassette at the cassette holding section. Therefore, the cassette need not wait at the cassette holding section until the processing of the taken-out sheet is finished, and it is possible to take the cassette out of the cassette holding section for sending to an external image recording apparatus immediately after the erased reusable sheet is conveyed into the cassette. Thus since the read-out apparatus is not occupied by a single sheet, it is possible to circulate and reuse the sheets efficiently. Also, in the case where the cassettes housing the sheets having different sizes are fed to the cassette holding section, sheets having different sizes may be held in advance at the stacker, and a sheet having the size corresponding to the cassette held at the cassette holding section may be selected and conveyed into the cassette. Accordingly, it is possible to improve the sheet circulation and reuse efficiency as in the case where the cassettes housing the sheets having the same sizes are fed to the cassette holding section.

DESCRIPTION OF THE PREFERRED EMBODIMENTS

The present invention will hereinbelow be described in further detail with reference to the accompanying drawings.

Figure 1:
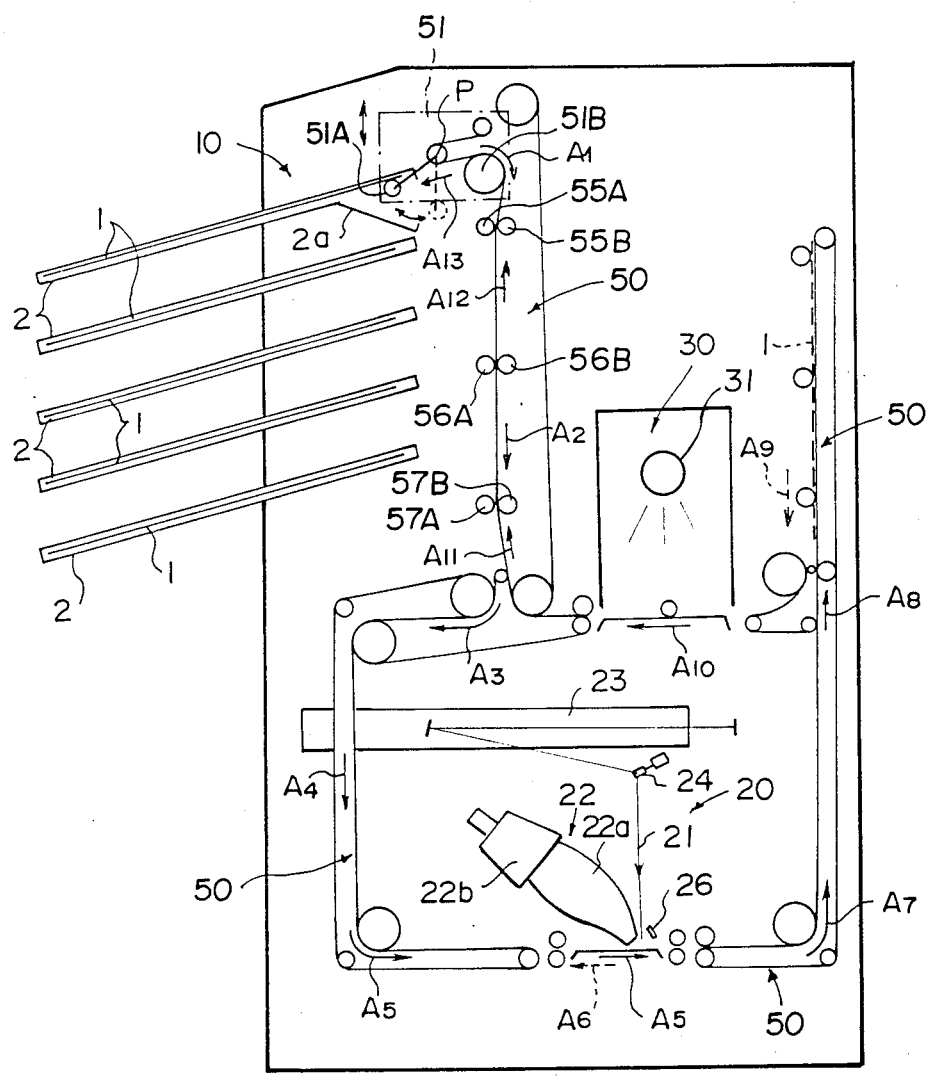
FIG. 1 is a schematic side view showing an embodiment of the radiation image read-out apparatus in accordance with the present invention.

Referring to FIG. 1, an embodiment of the radiation image read-out apparatus in accordance with the present invention is provided with a cassette holding section 10 for releasably holding a plurality of cassettes 2, 2, . . . capable of housing a stimulable phosphor sheet (hereinafter simply referred to as a sheet) 1 therein, a read-out section 20 for reading out a radiation image stored on the sheet 1, and an erasing section 30 for erasing radiation energy remaining on the sheet 1 after image read-out is conducted thereon. The sheet 1 is subjected to image recording in an external image recording apparatus (not shown) in the form housed in the cassette 2, and the cassette 2 housing the sheet 1 is fed to the cassette holding section 10. In this embodiment, by way of example, five cassettes 2, 2, . . . can be held at the cassette holding section 10. Each of the cassettes 2, 2, . . . is light-tight so that the sheet 1 is prevented from exposure to external light when it is exposed to a radiation to have a radiation image recorded thereon. The cassette 2 is provided with an openable cover member 2a at a part of the bottom. When the cassette 2 is fed into the cassette holding section 10, the cover member 2a is maintained in the closed position. When the sheet 1 is to be taken out of the cassette 2, the cover member 2a is opened downwardly as shown for the top cassette 2 at the cassette holding section 10 in FIG. 1 so that an end portion of the sheet 1 housed in the cassette 2 is laid bare.

At the cassette holding section 10, five cassettes 2, 2, . . . are held one above the other in parallel relation to each other, and taking-out of the sheet 1 is conducted from each of the cassettes 2, 2, . . . . Taking-out and conveyance of the sheet 1 will hereinbelow be described by taking the cassette 2 disposed at the top position among the five cassettes 2, 2, . . . held at the cassette holding section 10 as an example.

The embodiment of FIG. 1 is provided a sheet conveyance means 50 comprising endless belts, rollers, guide plates or the like for taking the sheet 1 out of an arbitrary cassette 2 at the cassette holding section 10, and conveying the sheet 1 to the read-out section 20 and the erasing section 30 in this order. A moveable conveyance device 51 is disposed at a part of the sheet conveyance means 50 for vertical movement to selectively face an end portion of an arbitrary one of the cassettes 2, 2, . . . held at the cassette holding section 10. When the sheet 1 is to be taken out of the top cassette 2 at the cassette holding section 10, the moveable conveyance device 51 is moved to its top position as shown in FIG. 1 to face the top cassette 2. The moveable conveyance device 51 is provided with a cassette cover opening mechanism (not shown), which first opens the cover member 2a of the cassette 2. The moveable conveyance device 51 is also provided with a sheet take-out roller 51A which is rotatable around a supporting point P from the position as indicated by the solid line in FIG. 1 to the position as indicated by the broken line. When the cover member 2a of the cassette 2 is opened, the sheet take-out roller 51A is moved to the position as indicated by the solid line to push the sheet 1 against the upper inner wall surface of the cassette 2, and is rotated in this condition to take the sheet 1 out of the cassette 2. The sheet 1 has been housed in the cassette 2 with its front surface provided with a stimulable phosphor layer facing up. The sheet 1 taken out of the cassette 2 by the sheet take-out roller 51A is conveyed by a roller 51B disposed inside of the moveable conveyance device 51 in the direction as indicated by the arrow A1, and then conveyed by the sheet conveyance means 50 in the directions as indicated by the arrows A2, A3, A4 and A5 to the read-out section 20.

At the read-out section 20, the sheet 1 carrying a radiation image stored thereon is scanned with stimulating rays 21 such as a laser beam which cause the sheet 1 to emit light in proportion to the stored radiation energy, and the emitted light is photoelectrically detected by a photoelectric read-out means 22 constituted by a photomultiplier or the like to obtain an electric image signal for use in reproduction of a visible image. Reference numeral 23 denotes a stimulating ray source, and reference numeral 24 denotes a light deflector such as a galvanometer mirror. Reference numeral 26 designates a reflection mirror for reflecting the light emitted by the sheet 1 towards a light guide member 22a of the photoelectric read-out means 22. The light guide member 22a guides the light through total reflection therein up to a photodetector 22b constituted by a photomultiplier or the like.

The sheet 1 sent to the read-out section 20 is conveyed by the sheet conveyance means 50 in the direction as indicated by the arrow A5, and the whole surface of the sheet 1 is scanned two-dimensionally by the stimulating rays 21 deflected approximately normal to the conveyance direction. The light emitted by the sheet 1 during the scanning is detected by the photodetector 22b via the light guide member 22a. Image read-out is conducted in this manner.

As for the radiation image read-out, there has heretofore been known a method wherein preliminary read-out for approximately ascertaining the radiation image stored on the sheet 1 is conducted prior to the aforesaid image read-out (final read-out) for obtaining an electric image signal for use in reproduction of a visible image, image read-out conditions for the final read-out or the like are adjusted based on the information obtained by the preliminary read-out, and the final read-out is carried out by use of the adjusted read-out conditions.

As disclosed in, for example, Japanese Unexamined Patent Publication No. 58(1983)-67240, the preliminary read-out may be conducted by scanning the sheet 1 with stimulating rays having stimulation energy of a level lower than the level of the stimulation energy of the stimulating rays used in the final read-out, and detecting the light emitted by the sheet 1 during the scanning by a photoelectric read-out means.

The read-out section 20 may be constituted to conduct only the final read-out or both the preliminary read-out and the final read-out. For example, the preliminary read-out may be conducted by conveying the sheet 1 in the direction as indicated by the arrow A5, and the final read-out may then be carried out by reversely conveying the sheet 1 in the direction as indicated by the arrow A6 to the read-out start position, and then conducting the final read-out while the sheet 1 is again conveyed in the direction as indicated by the arrow A5. The optical members at the read-out section 20 are not limited to those mentioned above. For example, a long photomultiplier may be disposed along the main scanning line as the photoelectric read-out means, and the light emitted by the sheet 1 may be detected thereby without using the light guide member 22a.

After image read-out from the sheet 1 is finished at the read-out section 20, the sheet 1 is conveyed by the sheet conveyance means 50 to the erasing section 30. Prior to the conveyance into the erasing section 30, the sheet 1 is conveyed by the sheet conveyance means 50 in the directions as indicated by the arrows A7 and A8. When the sheet 1 arrives at the position as indicated by the broken line in FIG. 1, the sheet 1 is switched back and reversely conveyed in the direction as indicated by the arrow A9. The sheet 1 is switched back in this manner since the sheet surface provided with the stimulable phosphor layer which faced up at the read-out section 20 should face up also at the erasing section 30, and should face up when the sheet 1 is again housed into the cassette 2.

At the erasing section 30, radiation energy remaining on the sheet 1 after the image read-out is conducted is erased. Specifically, a part of the radiation energy stored on the sheet 1 at the image recording step remains stored thereon after the image read-out is conducted. In order to reuse the sheet 1, the residual radiation energy is erased at the erasing section 30. In this embodiment, the erasing section 30 is provided with a plurality of erasing light sources 31, 31, . . . constituted by fluorescent lamps, tungsten-filament lamps, sodium lamps, xenon lamps, iodine lamps or the like, and the sheet 1 is exposed to the erasing light emitted by the erasing light sources 31, 31, . . . for releasing the residual radiation energy from the sheet 1 while the sheet 1 is conveyed in the direction as indicated by the arrow A10. At the erasing section 30, any known erasing method may be used. For example, erasing may be conducted by heating or by a combination of exposure to the erasing light with heating.

After erasing of the sheet 1 is finished at the erasing section 30, the sheet 1 is conveyed in the directions as indicated by the arrows A11 and A12. For conveying the sheet 1 in the directions as indicated by the arrows A11 and A12, the conveyance system for conveying the sheet 1 taken out of the cassette 2 in the directions as indicated by the arrows A1 and A2 are utilized. When the sheet 1 is to be conveyed in the directions as indicated by the arrows A11 and A12, the rollers of said conveyance system are rotated reversely to the directions in which they were rotated for conveying the sheet 1 to the read-out section 20. The sheet 1 conveyed near to the empty cassette 2 disposed at the top of the cassette holding section 10 is conveyed in the direction as indicated by the arrow A13 into the cassette 2 by the rollers 51B and the sheet take-out rollers 51A which are rotated reversely to when the sheet 1 was taken out of the cassette 2.

When image read-out and erasing are finished for the sheet 1 taken out of the cassette 2 at the top of the cassette holding section 10 and the sheet 1 is returned into the cassette 2, the moveable conveyance device 51 of the sheet conveyance means 50 is moved down until it faces an arbitrary cassette 2 below the top cassette 2, takes out the sheet 1 in the same manner as sheet taking-out from the top cassette 2, and conveys the taken-out sheet 1 to the read-out section 20 and the erasing section 30. When the taken-out sheet 1 is conveyed into the cassette holding section 10 after image read-out and erasing are finished for the sheet 1, the moveable conveyance device 51 conveys the erased reusable sheet 1 into the cassette 2, from which the sheet 1 was taken out, in the same manner as for the top cassette 2. Thus all of the sheets 1, 1, . . . housed in the cassettes 2, 2, . . . at the cassette holding section 10 are sequentially taken out of the cassettes 2, 2, . . . by the moveable conveyance device 51, sent to the read-out section 20 and the erasing section 30, and then returned into the corresponding cassettes 2, 2, . . . . After lapse of a predetermined time, all of the sheets 1, 1, . . . are ready for reuse in image recording.

Figure 2:
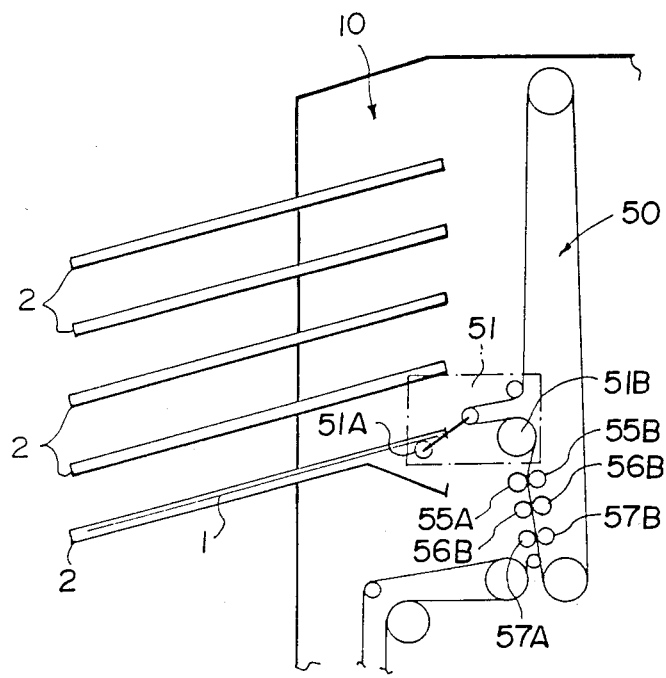
FIG. 2 is a schematic view showing the relationship between the positions of the cassette holding section and the moveable conveyance device in the embodiment of FIG. 1.

When the moveable conveyance device 51 is moved down from the position shown in FIG. 1, three pairs of rollers 55A and 55B, 56A and 56B, 57A and 57B disposed below the moveable conveyance device 51 obstruct the movement of the moveable conveyance device 51. Therefore, the three pairs of the rollers are interlocked with the downward movement of the moveable conveyance device 51 so that the three pairs of the rollers are also moved down with the spaces among the three roller pairs decreased gradually. FIG. 2 shows the relationship between the position of the moveable conveyance device 51 and the aforesaid three pairs of the rollers when the moveable conveyance device 51 is moved down until it faces, by way of example, the bottom cassette 2.

Before the moveable conveyance device 51 is moved down to the bottom position, the aforesaid three pairs of the rollers 55A and 55B, 56A and 56B, 57A and 57B are moved down to the positions lower than the bottom position of the moveable conveyance device 51 so that they do not obstruct the downward movement of the moveable conveyance device 51. Also, the three pairs of the rollers 55A and 55B, 56A and 56B, 57A and 57B are adjusted so that the spaces among the roller pairs in the vertical direction are shorter than the length of the sheet 1 as shown in FIG. 1 when the moveable conveyance device 51 is present at the top position. The rollers 55A, 55B, 56A, 56B, 57A and 57B are moved between the positions shown in FIG. 1 and the positions shown in FIG. 2 in accordance with the position of the moveable conveyance device 51 so that they can convey the sheet 1 regardless of the position of the moveable conveyance device 51.

With this embodiment, since a plurality of the cassettes 2, 2, . . . can be held at the cassette holding section 10, it is possible for the operator to load the readout apparatus with five cassettes 2, 2, . . . housing the sheets 1, 1, . . . carrying a radiation image stored thereon at one time, and unload the five cassettes 2, 2, . . . at one time from the read-out apparatus after image read-out and erasing are finished for all of the five sheets 1, 1, . . . which were housed in the cassettes 2, 2, . . . . It is also possible for the operator to load the read-out apparatus with the cassettes 2, 2, . . . housing the sheets 1, 1, . . . carrying a radiation image stored thereon sequentially, unload a necessary number of the cassettes 2, 2, . . . housing the erased reusable sheets 1, 1, . . . from the read-out apparatus when the operator is not busy, and load the read-out apparatus with new cassettes 2, 2, . . . In any case, with the aforesaid embodiment, since the freedom of the cassette exchanging operation becomes high, the operation frequency of the operator decreases, and the time for which the operator is bound becomes short, it is possible to conduct continuous processing very efficiently. Though the aforesaid embodiment is described for the case where a single sheet 1 is taken out of the cassette 2, subjected to image read-out and erasing, and returned into the cassette 2 from which the sheet 1 was taken out, and thereafter a sheet 1 is taken out of the next cassette 2, it is also possible to take the sheet 1 out of the next cassette 2 and convey it to the read-out section 20 before the sheet 1 taken out of the first cassette 2 is returned to said first cassette 2 when the sheet conveyance timing, the length of the sheet conveyance means 50, or the like is adjusted so that the same conveyance path is not pressed for conveyance of a plurality of the sheets, 1, 1, . . . . In this case, it becomes possible also to shorten the processing time for a plurality of the sheets 1, 1, . . . as a whole. When the sheets 1, 1, . . . have the same sizes, the sheet 1 taken out of one of the cassette 2 need not necessarily be returned to the same cassette 2 from which the sheet 1 was taken out.

The sheet conveyance means 50 may also be constituted to convey the sheet 1 out of and into an arbitrary cassette 2 at the cassette holding section 10 without using the moveable conveyance device 51.

Figure 3:
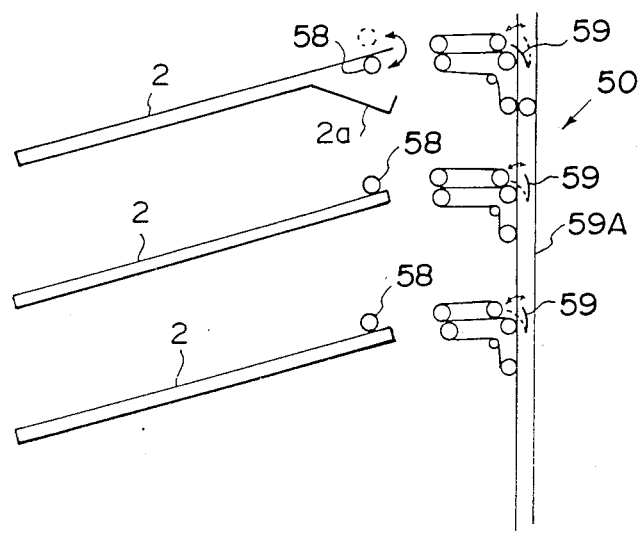
FIG. 3 is a schematic view showing the major part of the sheet conveyance means in another embodiment of the radiation image read-out apparatus in accordance with the present invention.

Specifically, as shown in FIG. 3, a sheet take-out roller 58 may be disposed for each of the cassettes 2, 2, . . . held at the cassette holding section 10 so that the sheet take-out roller 58 rotates into the cassette 2 to take out the sheet 1 when the cover member 2a of the cassette 2 is opened. Also, moveable plates 59, 59, . . . may be disposed in the sheet conveyance means 50 in the vicinity of the cassettes 2, 2, . . . for movement between the position retracted inward of a belt 59A of the sheet conveyance means 50 and the position projected outward of the belt 59A for controlling the conveyance direction of the sheet 1. In this case, only the moveable plate 59 in the vicinity of the cassette 2 for which sheet feeding and taking-out are to be conducted is selectively moved to the position projected outward of the belt 59A, thereby conducting sheet feeding and taking-out from an arbitrary cassette 2. Also, the layouts and the configurations of the cassette holding section 10, the read-out section 20, and the erasing section 30 are not limited to those employed in the aforesaid embodiment.

As an alternative, the cassette holding section may be made moveable up and down to enable sheet take-out.

A further embodiment of the radiation image read-out apparatus in accordance with the present invention will hereinbelow be described with reference to FIGS. 4 to 8.

Figure 4:
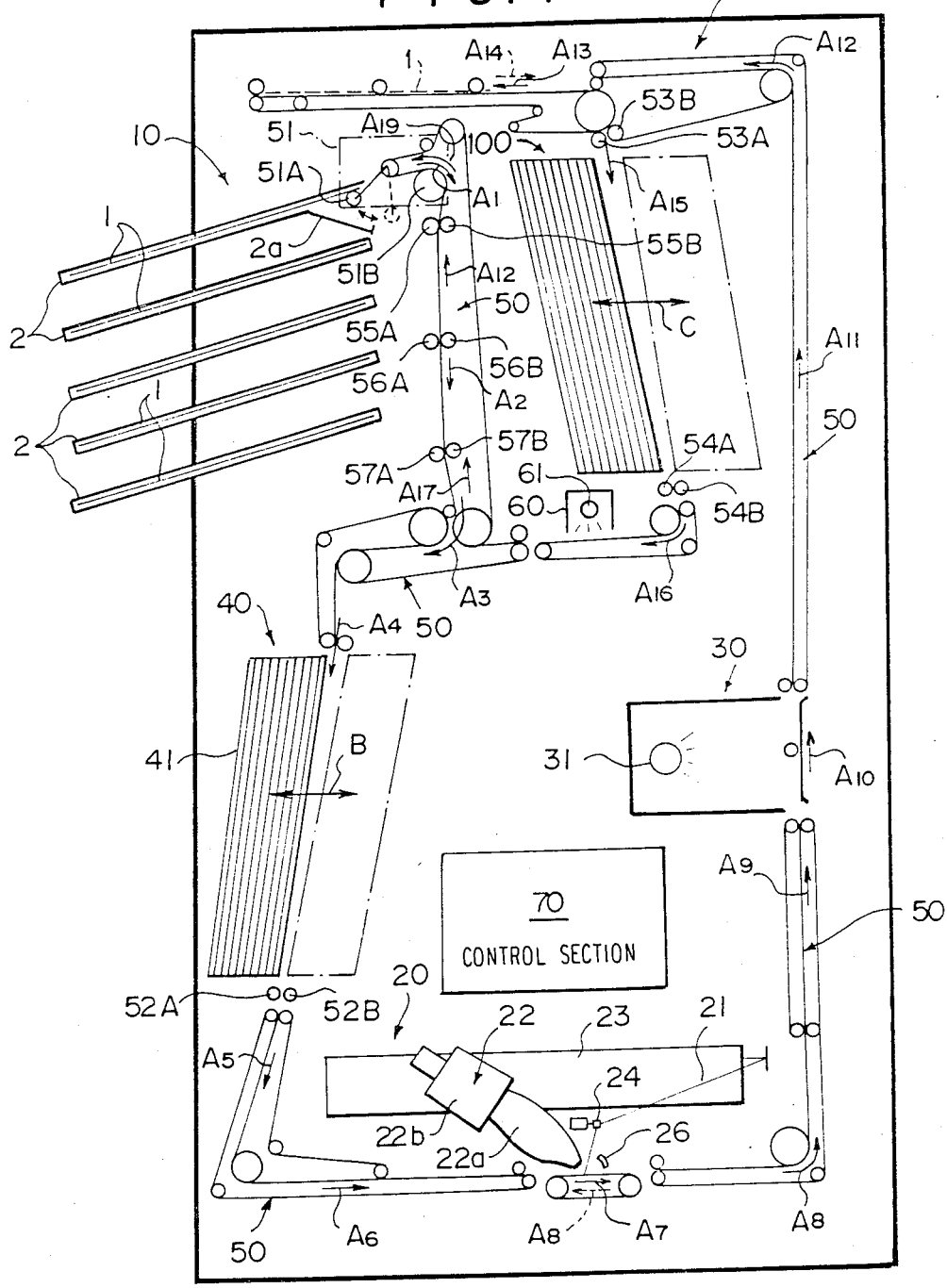
FIG. 4 is a schematic side view showing a further embodiment of the radiation image read-out apparatus in accordance with the present invention.

In FIG. 4, similar elements are numbered with the same reference numerals with respect to FIG. 1, except that the arrows A1 through A19 indicating the directions of sheet conveyance are numbered differently. In this embodiment, a first stacker 40 comprising a plurality of trays 41, 41, . . . for respectively housing a single sheet 1 therein is disposed at the sheet conveyance means 50 between the cassette holding section 10 and the read-out section 20. The first stacker 40 temporarily houses the sheets 1, 1, . . . conveyed out of the cassette holding section 10, and has a configuration similar to a second stacker described later. The sheet 1 conveyed in the direction as indicated by the arrow A4 is fed into one of the trays 41, 41, . . . of the first stacker 40 moveable in the direction as indicated by the arrow B. The upper end portion of the tray 41 for receiving the sheet 1 is opened when the sheet 1 is fed thereinto, and is closed when the sheet 1 has been fed thereinto. When the sheet 1 is to be fed out of the first stacker 40, the first stacker 40 is moved in the direction as indicated by the arrow B until the predetermined tray 41 containing the sheet 1 which should be fed thereout is positioned above feed-out rollers 52A, 52B provided below the first stacker 40, and the lower end of the tray 41 is opened to transfer the sheet 1 to the feed-out rollers 52A, 52B. The sheet 1 is then conveyed by the sheet conveyance means 50 in the directions as indicated by the arrows A5 and A6 into the read-out section 20.

Though a comparatively long time is taken for conducting the image read-out at the read-out section 20, since this embodiment is provided with the first stacker 40, it is possible to convey the sheets 1, 1, . . . each carrying a radiation image stored thereon sequentially into the first stacker 40 while image read-out is being conducted for one sheet 1, and thereby to process the sheets 1, 1, . . . very efficiently. It is also possible to preferentially send a specific sheet 1 among the sheets 1, 1, . . . housed in the first stacker 40 to the read-out section 20 for preferentially conducting image read-out from the specific sheet 1. The first stacker 40 need not necessarily be provided in the case where a cassette 2 housing a sheet 1 is always fed to the cassette holding section 10 after image read-out from a preceding sheet 1 is finished at the read-out section 20.

After image read-out from the sheet 1 is finished at the read-out section 20, the sheet 1 is conveyed by the sheet conveyance means 50 in the directions as indicated by the arrows A8 and A9 to the erasing section 30, and subjected to erasing therein.

After erasing of the sheet 1 is finished at the erasing section 30, the sheet 1 is conveyed in the direction as indicated by the arrow A11 and then in the directions as indicated by the arrows A12 and A13. After the sheet 1 is conveyed in the direction as indicated by the arrow A13 up to the position indicated by the broken line, the sheet 1 is switched back and reversely conveyed in the direction as indicated by the arrow A14 and then in the direction as indicated by the arrow A15 into a second stacker 100. The second stacker 100 has a configuration similar to the first stacker 40. The second stacker 100 is provided with a plurality of trays 103, 103, . . . , and moved in the direction as indicated by the arrow C for receiving the sheet 1 into either one of the trays 103, 103, . . . . Before the sheet 1 is conveyed into one of the trays 103, 103, . . . , a plurality of sheets 1, 1, . . . have already been housed in the other trays 103, 103, . . . . The configuration and function of the second stacker 100 will hereinbelow be described in detail with reference to FIGS. 4 to 8.

Figure 5:
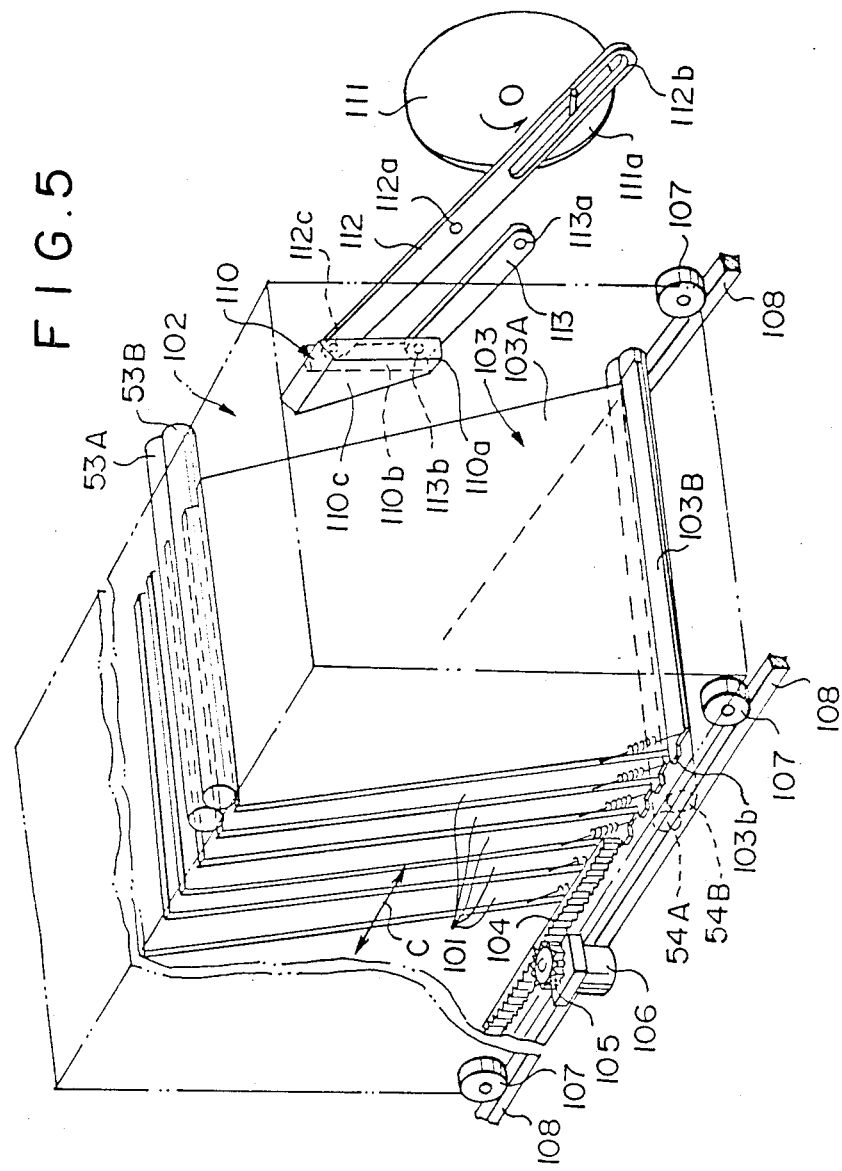
FIG. 5 is a perspective view showing the configuration of the second stacker in the embodiment of FIG. 4.
Figure 6:
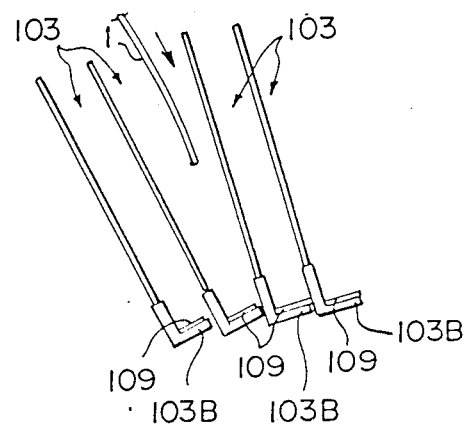
FIG. 6 is a side view showing the condition of the tray of the second stacker at the time of sheet feed thereinto.
Figure 8:
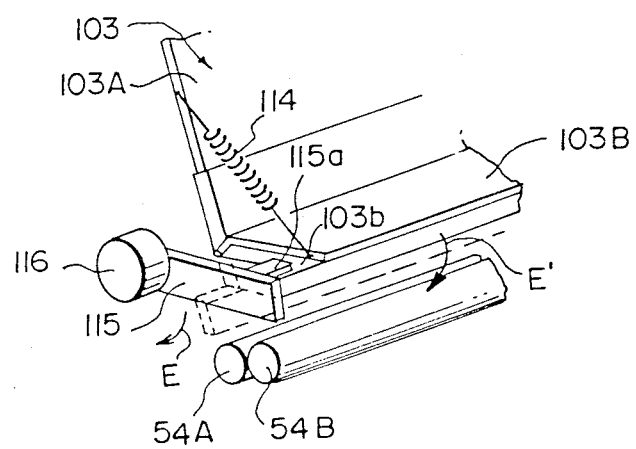
FIG. 8 is a perspective view showing the feed-out mechanism for feeding the stimulable phosphor sheet out of the second stacker.

As shown in FIG. 5, at the second stacker 100, a plurality of the trays 103, 103, . . . each for supporting a single sheet 1 respectively are disposed in equally spaced and parallel relation to each other in a case 102 constituted by four side walls. The trays 103, 103, . . . are inclined to face up obliquely. Each of the trays 103, 103, . . . is constituted by a supporting plate 103A and a bottom plate 103B approximately normal to the supporting plate 103A, and the space defined by the supporting plate 103A and the bottom plate 103B constitutes one sheet housing compartment 101. The right end portion of the supporting plate 103A is slanted so that the width of the supporting plate 103A becomes narrow towards the upper side, whereby the space between the trays 103, 103, . . . may be increased by a guide member 110 as described in detail later. For moving the case 102 provided with the trays 103, 103, . . . , a pinion 105 is engaged with a rack 104 secured to one side wall of the case 102 and is rotated by a motor 106. As a result, wheels 107, 107, . . . provided at the lower end of the case 102 move along rails 108, 108 to move the case 102 in the direction as indicated by the arrow C. In FIG. 4, the positions of the trays 103, 103, . . . with the case 102 positioned at the leftmost side are shown, and the trays 103, 103, . . . are moveable in the form housed in the case 102 up to the position indicated by the chain line. As the case 102 is moved in the direction as indicated by the arrow C, a different tray 103 comes to a position under feed-in rollers 53A, 53B for feeding the sheet 1 into the second stacker 100 as shown in FIGS. 4 and 5. The feed-in rollers 53A, 53B feed the sheet 1 into the tray 103 positioned thereunder. As shown in FIG. 6, when the sheet 1 is leaves the feed-in rollers 53A, 53B, it falls along the supporting plate 103A of the tray 103 into the tray 103. A cushioning material 109 for absorbing the shock of the falling sheet 1 is secured to the upper surface of the bottom plate 103B of each tray 103. Also, as shown in FIG. 6, the inclination of the tray 103 for receiving the sheet 1 is changed so that the space between said tray 103 and the adjacent tray 103 is increased for facilitating the feeding of the sheet 1 into said tray 103. In order to deflect the tray 103 in this manner, the guide member 110 is provided on the lateral side of the case 102. The guide member 110 is in the form of a wedge having a thickness gradually increasing upwardly, and the lower end portion is chamfered to form a chamfered surface 110a. The guide member 110 contacts the slanted right end portion of the supporting plate 103A of the tray 103 for receiving the sheet 1, and is inserted into the sheet housing compartment 101 to widen the space thereof. Since sheets 1, 1, . . . having different sizes may be fed into the trays 103, 103, . . . , the guide member 110 also adjusts the position of the sheet 1 in the tray 103 in accordance with the size of the sheet 1 fed into the tray 103. The drive mechanism and the action of the guide member 110 will now be described with reference to FIGS. 5, 7A, 7B and 7C.

Figure 7A:
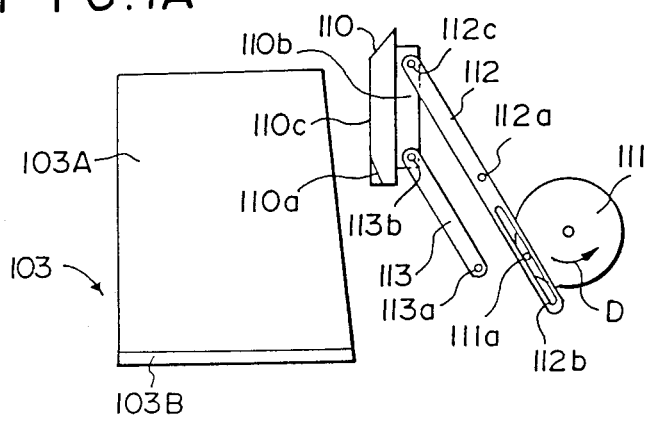
FIGS. 7A, 7B and 7C are explanatory views showing the function of the guide member at the second stacker.
Figure 7B:
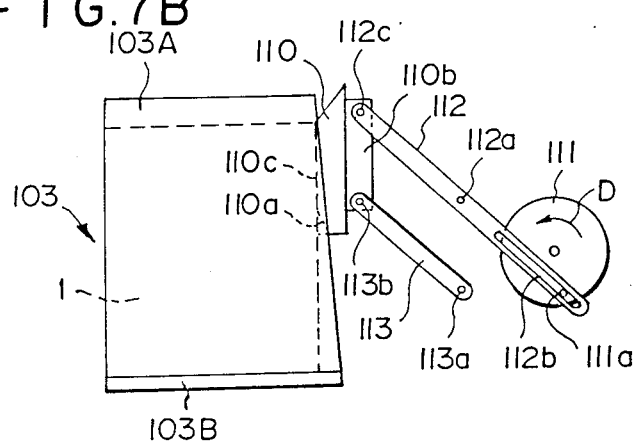
Figure 7C:
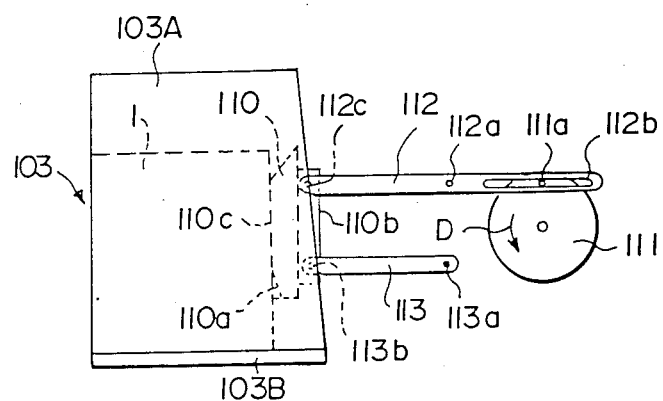

FIGS. 7A, 7B and 7C show the tray 103 and the guide member 110 as viewed from a direction parallel to the movement direction of the case 102 as indicated by the arrow C.

The guide member 110 is supported on a supporting member 110b. A swing arm 112 is rotatably supported at a center portion 112a, and has a long hole 112b provided at one end portion and engaged with a pin 111a secured to a rotatable plate 111. The other end 112c of the swing arm 112 is mounted on the upper portion of the supporting member 110b for the guide plate 110. A link member 113 is rotatably supported at one end portion 113a, and has the other end portion 113b mounted on the lower portion of the supporting member 110b. The rotatable plate 111 is rotated by a drive means (not shown) such as a motor in the direction as indicated by the arrow D. As shown in FIG. 7A, when the case 102 is moved as mentioned above, the guide member 110 is retracted from the tray 103. When the case 102 is stopped at the position for feeding the sheet 1 into the tray 103 and the tray 103 for receiving the sheet 1 is positioned on the lateral side of the guide member 110, the rotatable plate 111 is rotated counter-clockwise by a predetermined angle, so that the guide member 110 pushes the tray 103, widens the space of the sheet housing compartment 101, and advances up to the position shown in FIG. 7B. At the position shown in FIG. 7B, the guide member 110 pushes the tray 103 to widen the space between said tray 103 and a tray 103 adjacent thereto, thereby facilitating feed-in of the sheet 1, and to adjust the position of the fed-in sheet 1. Specifically, a side surface 110c of the guide member 110 contacts the side edge of the sheet 1 and adjusts the position of the sheet 1 in the width direction in accordance with the size of the sheet 1. In the case where the size of the sheet 1 is comparatively large, the guide member 110 is stopped at the position shown in FIG. 7B. As shown in FIG. 7C, in the case where the size of the sheet 1 introduced into the tray 103 is comparatively small, the guide member 110 advances more inwardly of the tray 103. While the space between the tray 103 and a tray 103 adjacent thereto is widened by the guide member 110, the sheet 1 is fed into said tray 103 by being guided along the side surface 110c of the guide member 110, and the position of the sheet 1 is adjusted by the guide member 110.

After the sheet 1 is fed into the tray 103, the rotatable plate 111 is rotated clockwise to return the guide member 110 to the position shown in FIG. 7A, and the tray 103 fed with the sheet 1 is returned to the position parallel to the adjacent tray 103.

Feeding of the erased reusable sheet 1 into the second stacker 100 is conducted in the manner as mentioned above. The sheets 1, 1, . . . housed in the respective trays 103, 103, . . . at the second stacker 100 are selected one by one, fed out of the second stacker 100, and introduced into the empty cassette 2 held at the cassette holding section 10. As mentioned above, the empty cassette from which the sheet 1 was taken out is the cassette 2 at the top position in the cassette holding section 10. Conveyance of the sheet 1 into the top cassette 2 is conducted immediately after the sheet 1 suitable for the top cassette 2 is selected from the sheets 1, 1, . . . housed in the second stacker 100 and the aforesaid sheet 1 is taken out of the top cassette 2. As shown in FIG. 4, a pair of feed-out rollers 54A, 54B are provided under the second stacker 100 for receiving the sheet 1 ejected from the second stacker 100 and feeding it out of the second stacker 100. The case 102 is moved in the direction as indicated by the arrow C so that the tray 103 housing the selected sheet 1 comes to the position above the feed-out rollers 54A, 54B. Ejection of the sheet 1 from the second stacker 100 after the case 102 is thus positioned will now be described with reference to FIG. 8.

The bottom plate 103B of the tray 103 is connected to the supporting plate 103A by a spring 114, and is normally at a position approximately perpendicular to the supporting plate 103A. A protrusion 103b is formed at the side end of the bottom plate 103B. A lever 115 provided with a protrusion 115a and rotatable in the direction as indicated by the arrow E by a drive means 116 constituted by a rotary solenoid or the like is disposed in the vicinity of the feed-out rollers 54A, 54B. When the sheet 1 is to be ejected from the tray 103, the protrusion 115a of the lever 115 is engaged with the protrusion 103b, and the lever 115 is rotated in the direction as indicated by the arrow E to extend the spring 114 and rotate the bottom plate 103B in the direction as indicated by the arrow E' up to the position lying approximately on the same plane as the supporting plate 103A as indicated by the broken line in FIG. 8. When the bottom plate 103B is rotated to said position, the sheet 1 falls by its weight out of the tray 103. The feed-out rollers 54A, 54B grasp the leading end of the falling sheet 1, and convey the sheet out of the second stacker 100. When the conveyance of the sheet 1 out of the second stacker 100 is finished, the lever 115 is returned to the position indicated by the solid line, and the bottom plate 103B is returned to the position indicated by the solid line by the returning force of the spring 114.

As shown in FIG. 4, the sheet 1 ejected from the second stacker 100 is conveyed by the sheet conveyance means 50 in the direction as indicated by the arrow A16, made to pass under an auxiliary erasing section 60 disposed in the conveyance path, and further conveyed in the directions as indicated by the arrows A17 and A18 by the conveyance system used for conveying the sheet 1 taken out of the cassette 2 in the directions as indicated by the arrows A1 and A2. The sheet 1 is then conveyed in the direction as indicated by the arrow A19 into the cassette 2.

The sheet 1 conveyed toward the cassette 2 is exposed to erasing light emitted by an erasing light source 61 at the auxiliary erasing section 60 since it may occur that the sheet 1 has been maintained at the second stacker 100 before the cassette 2 is fed to the cassette holding section 10 and a long time has elapsed after the sheet 1 was subjected to erasing at the erasing section 30. Specifically, when at least a predetermined time elapses after erasing is conducted on the stimulable phosphor sheet 1, the sheet 1 stores energy of radiations emitted by radioactive isotopes such as Ra226 and K40, which are contained in a trace amount in the stimulable phosphor, or energy of environmental radiations such as cosmic rays and X-rays emitted by other X-ray sources. These types of radiation energy undesirably stored on the sheet 1 cause noise in a radiation image recorded next on the sheet 1. In order to prevent noise generation, the sheet 1 is passed under the auxiliary erasing section 60 for conducting erasing (i.e. secondary erasing) by releasing the radiation energy stored on the sheet 1 while the sheet 1 is maintained at the second stacker 100. Therefore, the sheet 1 thus conveyed into the cassette 2 may be taken out of the read-out apparatus in the form housed in the cassette 2 and immediately used for image recording.

The moveable conveyance device 51 is then moved down to take out the sheet 1 from an arbitrary cassette 2. Immediately after conducting sheet taking-out, the moveable conveyance device 51 conveys the erased reusable sheet 1, which is ejected from the second stacker 100 and conveyed toward the cassette holding section 10, into the adjacent empty cassette 2. All of the image-recorded sheets 1, 1, ... housed in the cassettes 2, 2, ... at the cassette holding section 10 are thus sequentially taken out of the cassettes 2, 2, ... by the moveable conveyance device 51, and the erased reusable sheets 1, 1, ... ejected from the second stacker 100 are sequentially conveyed into the empty cassettes 2, 2, . . . . Therefore, the sheets 1, 1, ... reusable for image recording are conveyed into all of the cassettes 2, 2, ... held at the cassette holding section 10 very quickly after a plurality of the cassettes 2, 2, ... housing the image-recorded sheets 1, 1, ... are fed to the cassette holding section 10. The 5 cassettes 2, 2, ... housing the erased reusable sheets 1, 1, ... may then be conveyed to an image recording apparatus for conducting image recording. Accordingly, with this embodiment, it is possible to circulate and reuse the sheets 1, 1, ... very quickly.

Also, with the embodiment of FIG. 4, since the stacker, i.e. the second stacker 100, for receiving a plurality of the erased reusable sheets 1, 1, ... and selectively feeding out the sheets 1, 1, ... one by one is disposed between the erasing section 30 and the cassette holding section 10, it is possible to take an erased reusable sheet 1 out of the second stacker 100 and convey it into the cassette 2 immediately when an image-recorded sheet 1 is taken out of the cassette 2 at the cassette holding section 10. Therefore, it becomes possible to take out a plurality of the cassettes 2, 2, ... housing the erased reusable sheets 1, 1, ... from the cassette holding section 10 for sending them to an external image recording apparatus within a short time after a plurality of the cassettes 2, 2, ... housing the image-recorded sheets 1, 1, ... are fed to the cassette holding section 10. In the case where the cassettes 2, 2, ... housing the image-recorded sheets 1, 1, ... having different sizes are fed to the cassette holding section 10, since the sheets 1, 1, ... having different sizes may be held in advance at the second stacker 100 and may be selectively fed out of the second stacker 100 in accordance with the size of the cassette 2 to which the sheet 1 is to be fed, it is possible to circulate and reuse the sheets 1, 1, ... efficiently regardless of the sheet sizes. In order to maintain the sheets 1, 1, ... having different sizes in advance in the second stacker 100, they may be collected into the second stacker 100 without conducting sheet take-out therefrom for a while after the operation of the read-out apparatus is started, or unexposed sheets 1, 1, ... having different sizes may be loaded into the second stacker 100 before the operation of the apparatus is started. In order to select a sheet 1 having a size suitable for the cassette 2 fed to the cassette holding section 10 and take it out of the second stacker 100, it is necessary to use a control means for memorizing the sizes of the sheets 1, 1, ... housed in the trays 103, 103, ... at the second stacker 100 and controlling the selection and taking-out of a sheet 1 having a size suitable for the cassette 2 fed to the cassette holding section 10. For this purpose, this embodiment is provided with a control section 70 disposed above the read-out section 20. The respective trays 103, 103, ... in the second stacker 100 may be determined in advance for the respective sizes of the sheets 1, 1, ... housed therein, or may be used regardless of the sheet sizes.

We claim:

1. A radiation image read-out apparatus for taking a stimulable phosphor sheet out of a detachable cassette housing, said stimulable phosphor sheet carrying a radiation image thereon, reading out said radiation image from said stimulable phosphor sheet, erasing radiation energy remaining on said stimulable phosphor sheet after said radiation image is read-out therefrom, and then conveying said stimulable phosphsor sheet into as detachable cassette, comprising:

(i) a read-out section for reading out a radiation image stored on a stimulable phospshor sheet,
   (ii) an erasing section for erasing radiation energy remaining on said stimulable phosphor sheet after image read-out from said stimulable phosphor sheet is finished,
   (iii) a cassette holding section for releasably holding a plurality of cassettes capable of housing said stimulable phosphor sheet therein, and
   (iv) a sheet conveyance means for taking said stimulable phosphor sheeet out of an arbitrary one of said plurality of the cassettes, conveying said stimulable phosphor sheet to said read-out section and said erasing section, and then conveying said stimulable phosphor sheet into an arbitrary one of said plurality of the cassettes.

2. An apparatus as defined in claim 1 wherein said sheet conveyance means is provided at a part thereof with a moveable conveyance device for moving to face selectively with an end portion of an arbitrary cassette among said plurality of the cassettes held at said cassette holding section.

3. An apparatus as defined in claim 2 wherein members of said sheet conveyance means in the vicinity of said moveable conveyance device are interlocked with said moveable conveyance device so that said members of said sheet conveyance means are moved in accordance with the position of said moveable conveyance device.

4. A radiation image read-out apparatus for taking a stimulable phosphor sheet out of a detachable cassette housing said stimulable phosphor sheet carrying a radiation image thereon, reading out said radiation image from said stimulable phosphor sheet, erasing radiation energy remaining on said stimulable phosphor sheet after said radiation image is read-out therefrom, and then conveying said stimulable phosphor sheet into a detachable cassette, comprising:

(i) a read-out section for reading out a radiation image stored on a stimulable phosphor sheet,
   (ii) an erasing section for erasing radiation energy remaining on said stimulable phosphor sheet after image read-out from said stimulable phosphor sheet is finished, (iii) a cassette holding section for releasably holding a plurality of cassettes capable of housing said stimulable phosphor sheet therein, (iv) a stacker capable of supporting a plurality of said stimulable phosphor sheets, receiving said stimulable phosphor sheets erased at said erasing section, and selectively feeding said supported stimulable phosphor sheets one by one out of said stacker, and (v) a sheet conveyance means for taking said stimulable phosphor sheet out of an arbitrary one of said plurality of the cassettes, conveying said stimulable phosphor sheet to said read-out section and said erasing section in this order, thereafter conveying said stimulable phosphor sheet into said stacker, receiving said stimulable phosphor sheet fed out of said stacker, and conveying said stimulable phosphor sheet into an arbitrary one of said plurality of the cassettes held at said cassette holding section.

5. An apparatus as defined in claim 4 wherein said sheet conveyance means is provided with a stacker disposed between said cassette holding section and said read-out section for temporarily housing said stimulable phosphor sheet conveyed out of said cassette holding section.

6. An apparatus as defined in claim 4 wherein said sheet conveyance means is provided at a part thereof with a moveable conveyance device for moving to face selectively with an end portion of an arbitrary cassette among said plurality of the cassettes held at said cassette holding section.

7. An apparatus as defined in claim 5 wherein said sheet conveyance means is provided at a part thereof with a moveable conveyance device for moving to face selectively with an end portion of an arbitrary cassette among said plurality of the cassettes held at said cassette holding section.

8. An apparatus as defined in claim 6 wherein members of said sheet conveyance means in the vicinity of said moveable conveyance device are interlocked with said moveable conveyance device so that said members of said sheet conveyance means are moved in accordance with the position of said moveable conveyance device.

9. An apparatus as defined in claim 7 wherein members of said sheet conveyance means in the vicinity of said moveable conveyance device are interlocked with said moveable conveyance device so that said members of said sheet conveyance means are moved in accordance with the position of said moveable conveyance device.

10. an apparatus as defined in claim 4 wherein said stacker comprises:

(a) a tray unit composed of a casing and a plurality of trays disposed in said casing for holding said stimulable phosphor sheets respectively in equally spaced and parallel relation to each other in a supported position, (b) a feed-in means provided above said tray unit for feeding said stimulable phosphor sheets fed by said sheet conveyance means into said tray unit, (c) a feed-out means provided under the tray unit for receiving the sheets discharged out of said tray unit and conveying the stimulable phosphor sheets into said sheet conveyance means, and (d) a moving means for moving said tray unit so that every tray in said casing can be brought under said feed-in means and above said feed-out means.

11. An apparatus as defined in claim 10 wherein said stacker further comprises a wedge-shaped guide member provided beside the tray located under said feed-in means and moveable into said tray for changing the angle of inclination of the tray to enlarge the space between the tray and an adjacent tray to facilitate feed-in of the stimulable phosphor sheet.

12. An apparatus as defined in claim 11 wherein said wedge-shaped guide member is controlled of its depth of insertion into the tray in accordance with the size of the stimulable phosphor sheet fed into the tray for guiding and positioning the fed-in stimulable phosphor sheet in the lateral direction.

13. An apparatus as defined in claim 10 wherein each of said trays comprises a supporting plate for guiding said stimulable phosphor sheet fed-in by said feed-in means and supporting the fed-in stimulable phosphor sheet, and a bottom plate provided at the lower end of said supporting plate moveable between a first position to receive the lower end of said stimulable phosphor sheet and hold the stimulable phosphor sheet in the tray and a second position rotated downward from the first position to allow the stimulable phosphor sheet to fall by its weight and discharge it out of the tray unit.

14. An apparatus as defined in claim 11 wherein each of said trays comprises a supporting plate for guiding said stimulable phosphor sheet fed-in by said feed-in means and supporting the fed-in stimulable phosphor sheet, and a bottom plate provided at the lower end of said supporting plate moveable between a first position to receive the lower end of said stimulable phosphor sheet and hold the stimulable phosphor sheet in the tray and a second position rotated downward from the first position to allow the stimulable phosphor sheet to fall by its weight and discharge it out of the tray unit.

15. An apparatus as defined in claim 5 wherein said stacker disposed between said cassette holding section and said read-out section for temporarily housing said stimulable phosphor sheet conveyed out of said cassette holding section comprises:

(a) a tray unit composed of a casing and a plurality of trays disposed in said casing for holding said stimulable phosphor sheets respectively in equally spaced and parallel relation to each other in a supported position, (b) a feed-in means provided above said tray unit for feeding said stimulable phosphor sheets fed by said sheet conveyance means into said tray unit, (c) a feed-out means provided under the tray unit for receiving the sheets discharged out of said tray unit and conveying the stimulable phosphor sheets into said sheet conveyance means, and (d) a moving means for moving said tray unit so that every tray in said casing can be brought under said feed-in means and above said feed-out means.

16. An apparatus as defined in claim 15 wherein said stacker further comprises a wedge-shaped guide member provided beside the tray located under said feed-in means and moveable into said tray for changing the angle of inclination of the tray to enlarge the space between the tray and an adjacent tray to facilitate feed-in of the stimulable phosphor sheet.

17. An apparatus as defined in claim 16 wherein said wedge-shaped guide member is controlled of its depth of insertion into the tray in accordance with the size of the stimulable phosphor sheet fed into the tray for guiding and positioning the fed-in stimulable phosphor sheet in the lateral direction.

18. An apparatus as defined in claim 15 wherein each of said trays comprises a supporting plate for guiding said stimulable phosphor sheet fed-in by said feed-in means and supporting the fed-in stimulable phosphor sheet, and a bottom plate provided at the lower end of said supporting plate moveable between a first position to receive the lower end of said stimulable phosphor sheet and hold the stimulable phosphor sheet in the tray and a second position rotated downward from the first position to allow the stimulable phosphor sheet to fall by its weight and discharge it out of the tray unit.

19. An apparatus as defined in claim 16 wherein each of said trays comprises a supporting plate for guiding said stimulable phosphor sheet fed-in by said feed-in means and supporting the fed-in stimulable phosphor sheet, and a bottom plate provided at the lower end of said supporting plate moveable between a first position to receive the lower end of said stimulable phosphor sheet and hold the stimulable phosphor sheet in the tray and a second position rotated downward from the first position to allow the stimulable phosphor sheet to fall by its weight and discharge it out of the tray unit.

20. An apparatus as defined in claim 4 wherein said sheet conveyance means is provided with an auxiliary erasing section disposed between said stacker and said cassette holding section.

* * * * *